United States Patent
Wachdorf et al.

(10) Patent No.: US 10,423,787 B2
(45) Date of Patent: Sep. 24, 2019

(54) CYBERSECURITY SYSTEMS AND TECHNIQUES

(71) Applicant: Carbon Black, Inc., Waltham, MA (US)

(72) Inventors: Daniel Wachdorf, San Antonio, TX (US); Scott Lundgren, Newton, MA (US)

(73) Assignee: Carbon Black, Inc., Waltham, MA (US)

( * ) Notice: Subject to any disclaimer, the term of this patent is extended or adjusted under 35 U.S.C. 154(b) by 25 days.

(21) Appl. No.: 15/440,401

(22) Filed: Feb. 23, 2017

(65) Prior Publication Data
US 2017/0329968 A1 Nov. 16, 2017

Related U.S. Application Data

(60) Provisional application No. 62/298,707, filed on Feb. 23, 2016.

(51) Int. Cl.
*H04L 9/00* (2006.01)
*G06F 21/56* (2013.01)
(Continued)

(52) U.S. Cl.
CPC .......... *G06F 21/564* (2013.01); *G06F 21/554* (2013.01); *G06F 21/566* (2013.01);
(Continued)

(58) Field of Classification Search
CPC ...... G06F 21/50; G06F 21/554; G06F 21/564; G06F 21/566; H04L 63/145; H04L 63/1416
See application file for complete search history.

(56) References Cited

U.S. PATENT DOCUMENTS 7,698,744 B2 4/2010 Fanton et al.
7,841,008 B1 11/2010 Cole et al.
(Continued)

FOREIGN PATENT DOCUMENTS

EP 2916256 A1 9/2015
WO WO-2011/019720 A1 2/2011

OTHER PUBLICATIONS

International Search Report and Written Opinion for International Application No. PCT/US2017/019029 dated Apr. 25, 2017 (13 pages).
(Continued)

*Primary Examiner* — Beemnet W Dada
(74) *Attorney, Agent, or Firm* — Goodwin Procter LLP

(57) ABSTRACT

Cybersecurity systems and techniques are described. A cybersecurity method may include generating a process fingerprint of a process, wherein the process fingerprint identifies the process based, at least in part, on dynamic features of the process. Generating the process fingerprint may include performing a cryptographic hash operation on data representing dynamic features of the process. The method may further include comparing the process fingerprint to a plurality of process fingerprints, and based, at least in part, on a result of the comparison, performing a data reduction operation on data associated with the process and/or determining whether the process is a malware process.

28 Claims, 1 Drawing Sheet

(51) Int. Cl.
*H04L 29/06* (2006.01)
*G06F 21/55* (2013.01)
*G06F 21/50* (2013.01)

(52) U.S. Cl.
CPC ........ *H04L 63/145* (2013.01); *H04L 63/1416* (2013.01); *G06F 21/50* (2013.01)

(56) References Cited

U.S. PATENT DOCUMENTS

| | | | |
|---|---|---|---|
| 8,234,640 | B1 | 7/2012 | Fitzgerald et al. |
| 8,701,192 | B1 | 4/2014 | Glick et al. |
| 9,043,903 | B2 | 5/2015 | Diehl et al. |
| 9,223,978 | B2 | 12/2015 | Kraemer |
| 9,460,285 | B2 | 10/2016 | Kraemer |
| 9,917,864 | B2 | 3/2018 | Kraemer |
| 2005/0188272 | A1 | 8/2005 | Bodorin et al. |
| 2006/0036693 | A1 | 2/2006 | Hulten et al. |
| 2010/0211772 | A1 | 8/2010 | Johansson et al. |
| 2011/0047594 | A1 | 2/2011 | Mahaffey et al. |
| 2011/0047620 | A1 | 2/2011 | Mahaffey et al. |
| 2011/0185417 | A1 | 7/2011 | Zhou et al. |
| 2012/0240229 | A1 | 9/2012 | Sobel et al. |
| 2013/0097660 | A1 | 4/2013 | Das et al. |
| 2013/0111547 | A1 | 5/2013 | Kraemer |
| 2013/0111591 | A1 | 5/2013 | Topan et al. |
| 2014/0189776 | A1 | 7/2014 | Diehl |
| 2015/0096023 | A1* | 4/2015 | Mesdaq ................ H04L 63/145 726/23 |
| 2015/0101044 | A1 | 4/2015 | Martin et al. |
| 2015/0227741 | A1 | 8/2015 | Permeh et al. |
| 2015/0350237 | A1 | 12/2015 | Kraemer |
| 2016/0373486 | A1 | 12/2016 | Kraemer |
| 2018/0152481 | A1 | 5/2018 | Kraemer |

OTHER PUBLICATIONS

U.S. Appl. No. 15/881,044, Security Policy Deployment and Enforcement System for the Detection and Control of Polymorphic and Targeted Malware, filed Jan. 26, 2018.

Comodo, "Comodo Cloud Scanner—Software version 2.0 User guide," Jul. 25, 2011, Comodo Security Solutions Inc., pp. 1-44.

International Preliminary Report on Patentability for International Application No. PCT/US2012/062229 dated May 8, 2014.

International Search Report and Written Opinion for International Application No. PCT/US2012/062229 dated Feb. 13, 2013.

Yanfang, Y. et al., "Combining File Content and File Relations for Cloud Based Malware Detection," KDD'11, Aug. 21-24, 2011, San Diego, California, USA, pp. 222-230.

\* cited by examiner

CYBERSECURITY SYSTEMS AND TECHNIQUES

CROSS-REFERENCE TO RELATED APPLICATION(S)

This application claims priority and benefit under 35 U.S.C. § 119(e) of U.S. Provisional Patent Application Ser. No. 62/298,707, titled "Cybersecurity Systems and Techniques" and filed on Feb. 23, 2016, which is hereby incorporated by reference herein in its entirety.

FIELD OF INVENTION

The present disclosure relates generally to cybersecurity systems and techniques. In particular, some embodiments relate to systems and techniques for enhancing the performance of cybersecurity systems and techniques based, at least in part, on dynamic features of processes.

BACKGROUND

As the Internet and other networked computer systems become increasingly integrated into public activities (e.g., management and operation of governmental organizations) and private activities (e.g., personal activities, management and operation of households and businesses, etc.), malicious software ("malware") poses an increasingly significant threat to such pursuits. Malware generally operates to disrupt operation of computer systems (e.g., by taking control of computational resources and using those resources for unauthorized purposes, by disabling individual computers or entire networks, by damaging or otherwise sabotaging system components, etc.) and/or to steal resources from computer systems (e.g., by gathering sensitive data). Malware can be deployed in many forms, including computer viruses, worms, trojan horses, ransomware, spyware, adware, scareware, keystroke loggers, rootkits, bots, crimeware, phishing scams, etc.

Computer users devote significant resources to detecting malware and preventing malware from disrupting the operations of their computer systems or stealing their computer-based resources. Conventional cybersecurity engines have relied extensively on static, signature-based techniques for detecting malware. In general, static, signature-based malware detection involves obtaining a copy of a file that is known to contain malware, analyzing the static features of the file (e.g., the sequence of bytes contained in the file) to extract a static signature that is characteristic of the malware, and adding the malware's static signature to a database (often referred to as a "blacklist") of known malware. When a user attempts to access (e.g., download, open, or execute) a file, the cybersecurity engine scans the file and extracts the file's static signature. If the file's static signature matches a signature on the blacklist, the cybersecurity engine detects the presence of malware and intervenes to prevent the malware from executing (e.g., by quarantining or deleting the file).

Static, signature-based malware detection techniques are generally useful for quickly detecting known malware. However, these techniques can generally be circumvented by new malware that is not yet blacklisted (e.g., zero-day malware or next-generation malware) or by malware that modifies itself to avoid matching a static signature on the blacklist (e.g., oligomorphic, polymorphic, or metamorphic malware).

Some cybersecurity engines rely on behavior-based techniques for detecting malware. In general, behavior-based malware detection involves monitoring the execution of a process, identifying suspicious features of the process's execution (e.g., suspicious process behaviors, which may include unpacking code, modifying the host file, logging keystrokes, etc.). When suspicious behaviors are identified, the cybersecurity engine intervenes to protect the computer system (e.g., by terminating or quarantining the process) and assess the threat (e.g., by initiating a forensic investigation of the process, etc.).

SUMMARY OF THE INVENTION

Behavior-based malware detection techniques can protect computer systems from certain types of malware (for example, zero-day malware and self-modifying malware) that are difficult to detect using blacklists of static signatures. However, behavior-based malware detection techniques can place significant demands on the host computer system's resources, and can therefore substantially degrade the host computer system's performance. For example, a cybersecurity engine that performs behavior-based malware detection may maintain logs of the behavior of processes that are executing or have executed on a computer system. These logs can be used to detect suspicious behavior or to facilitate forensic investigation when suspicious behavior has been detected. Collectively, these behavior logs can occupy a large volume of storage, and updating the logs as the processes execute can consume a significant portion of the computer system's processing resources.

More efficient systems and techniques for behavior-based malware detection are needed. In many cases, much of the information contained in process behavior logs is ultimately not helpful for detecting suspicious process behavior and not useful for forensic investigation. The inventors have recognized and appreciated that a relatively small amount of data (e.g., a "dynamic signature" or "process fingerprint") can, in some embodiments, be used to characterize a process's dynamic features (e.g., behavior) and can be useful for detecting suspicious process behavior and/or for forensic investigation. The present disclosure describes techniques for generating process fingerprints and using them to detect malware.

According to an aspect of the present disclosure, a cybersecurity method includes generating a process fingerprint of a process, wherein the process fingerprint identifies the process based, at least in part, on dynamic features of the process, comparing the process fingerprint to a plurality of process fingerprints, and based at least in part on a result of the comparison, performing a data reduction operation on data associated with the process and/or determining whether the process is a malware process.

In some embodiments, generating the process fingerprint includes performing a cryptographic hash operation on data representing dynamic features of the process. In some embodiments, the data representing dynamic features of the process includes data characterizing modules loaded by the process. In some embodiments, the data representing dynamic features of the process includes data characterizing file operations associated with the process. In some embodiments, the data representing dynamic features of the process includes data characterizing registry operations performed by the process. In some embodiments, the data representing dynamic features of the process includes data characterizing network activity associated with the process. In some embodiments, the data representing dynamic features of the process includes data characterizing inter-process operations performed by the process. In some embodiments, generating the process fingerprint further includes performing the cryptographic hash operation on data representing static features of a file corresponding to the process. In some embodiments, the cryptographic hash operation is a rolling cryptographic hash operation. In some embodiments, the cryptographic hash operation is a deterministic, sequence-invariant cryptographic hash operation.

In some embodiments, generating the process fingerprint includes generating a first process fingerprint and a second process fingerprint. In some embodiments, generating the first process fingerprint includes performing a cryptographic hash operation on data representing first dynamic features of the process, and generating the second process fingerprint includes performing a cryptographic hash operation on data representing second dynamic features of the process. In some embodiments, the data representing first dynamic features of the process are selected from the group consisting of data characterizing modules loaded by the process, data characterizing file operations associated with the process, data characterizing registry operations performed by the process, data characterizing network activity associated with the process, and data characterizing inter-process operations performed by the process. In some embodiments, the data representing second dynamic features of the process are different from the data representing first dynamic features of the process, and the data representing second dynamic features of the process are selected from the group consisting of data characterizing modules loaded by the process, data characterizing file operations associated with the process, data characterizing registry operations performed by the process, data characterizing network activity associated with the process, and data characterizing inter-process operations performed by the process.

In some embodiments, the method further includes generating a log of at least some operations performed by the process, and performing the data reduction operation on the data associated with the process includes deleting the log. In some embodiments, performing the data reduction operation on the data associated with the process further includes replacing the log with the process fingerprint of the process. In some embodiments, performing the data reduction operation on the data associated with the process further includes replacing the log with the process fingerprint of the process and data indicating a date and/or time of execution of the process. In some embodiments, performing the data reduction operation based on the result of the comparison includes performing the data reduction operation based on the process fingerprint matching a process fingerprint included in the plurality of process fingerprints.

In some embodiments, the plurality of process fingerprints includes one or more process fingerprints of one or more blacklisted processes, and determining whether the process is a malware process based on the result of the comparison includes determining that the process is a malware process based on the process fingerprint matching a fingerprint included in the one or more process fingerprints of the one or more blacklisted processes. In some embodiments, the plurality of process fingerprints includes one or more process fingerprints of one or more whitelisted processes, and determining whether the process is a malware process based on the result of the comparison includes determining that the process is not a malware process based on the process fingerprint matching a fingerprint included in the one or more process fingerprints of the one or more whitelisted processes.

According to another aspect of the present disclosure, a computer-implemented cybersecurity method includes: generating a log of at least some operations performed by a process; generating a process fingerprint of the process, wherein the process fingerprint identifies the process based, at least in part, on dynamic features of the process; comparing the process fingerprint to a plurality of process fingerprints; and based, at least in part, on a result of the comparison, performing a data reduction operation on data associated with the process, wherein performing the data reduction operation on the data associated with the process includes deleting the log, wherein generating the process fingerprint includes performing a cryptographic hash operation on data representing dynamic features of the process, and wherein the data representing dynamic features of the process includes data characterizing modules loaded by the process, data characterizing file operations associated with the process, data characterizing registry operations performed by the process, data characterizing network activity associated with the process, and/or data characterizing inter-process operations performed by the process.

According to another aspect of the present disclosure, a cybersecurity system includes data processing apparatus programmed to perform operations including generating a process fingerprint of a process, wherein the process fingerprint identifies the process based, at least in part, on dynamic features of the process, comparing the process fingerprint to a plurality of process fingerprints, and based at least in part on a result of the comparison, performing a data reduction operation on data associated with the process and/or determining whether the process is a malware process.

In some embodiments, generating the process fingerprint includes performing a cryptographic hash operation on data representing dynamic features of the process, and wherein the data representing dynamic features of the process includes data characterizing modules loaded by the process, data characterizing file operations associated with the process, data characterizing registry operations performed by the process, data characterizing network activity associated with the process, and/or data characterizing inter-process operations performed by the process. In some embodiments, the cryptographic hash operation is a rolling cryptographic hash operation. In some embodiments, the cryptographic hash operation is a deterministic, sequence-invariant cryptographic hash operation.

In some embodiments, generating the process fingerprint includes generating a first process fingerprint and a second process fingerprint. In some embodiments, generating the first process fingerprint includes performing a cryptographic hash operation on data representing first dynamic features of the process, the first dynamic features being dynamic features of a first type, and generating the second process fingerprint includes performing a cryptographic hash operation on data representing second dynamic features of the process, the second dynamic features being dynamic features of a second type different from the first type.

In some embodiments, the operations further include generating a log of at least some operations performed by the process, and performing the data reduction operation on the data associated with the process includes deleting the log. In some embodiments, performing the data reduction operation on the data associated with the process further includes replacing the log with the process fingerprint of the process. In some embodiments, performing the data reduction operation based on the result of the comparison includes performing the data reduction operation based on the process fingerprint matching a process fingerprint included in the plurality of process fingerprints.

According to another aspect of the present disclosure, a computer storage medium is provided, the computer storage medium having instructions stored thereon that, when executed by data processing apparatus, cause the data processing apparatus to perform operations including generating a process fingerprint of a process, wherein the process fingerprint identifies the process based, at least in part, on dynamic features of the process, comparing the process fingerprint to a plurality of process fingerprints, and based at least in part on a result of the comparison, performing a data reduction operation on data associated with the process and/or determining whether the process is a malware process.

Some embodiments of the techniques described herein may exhibit certain advantages over conventional cybersecurity systems and techniques. For example, some cybersecurity systems that use process fingerprints to characterize process behavior may be more efficient than behavior-based malware detection systems that rely primarily on process behavior logs to characterize process behavior. In particular, relative to systems that rely primarily on process behavior logs to characterize process behavior, some embodiments of the cybersecurity systems described herein may use less of the host computer system's processing and/or storage resources for detection and investigation of malware. In this way, some embodiments can improve the functioning and overall performance of the host computer system.

Other aspects and advantages of the invention will become apparent from the following drawings, detailed description, and claims, all of which illustrate the principles of the invention, by way of example only. The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
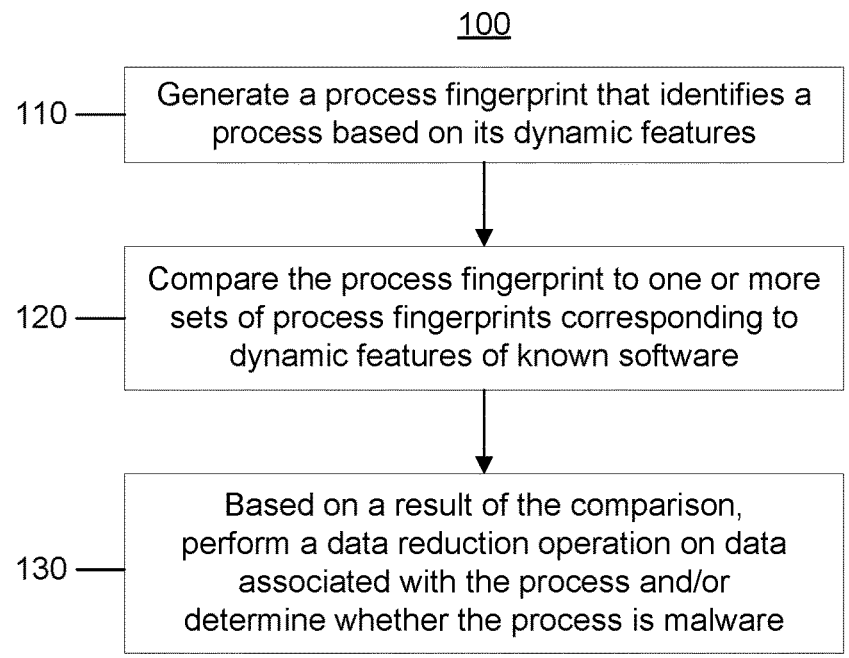
FIG. 1 is a flowchart of a cybersecurity method, in accordance with some embodiments.

FIG. 1 shows a cybersecurity method 100, in accordance with some embodiments. In some embodiments, the method 100 facilitates behavior-based malware detection and response, while using significantly less data processing resources and/or data storage resources than conventional behavior-based malware detection and response techniques. In step 110 of the malware threat detection and response method 100, a "process fingerprint" (or "dynamic signature") of a process is generated. The process fingerprint identifies a process based at least in part on its dynamic features. In step 120, the process fingerprint is compared to one or more sets of process fingerprints corresponding to dynamic features (e.g., behavior) of known processes (e.g., processes that are known to be legitimate, processes that are known to be malware, and/or other processes). In step 130, based on a result of the fingerprint comparison(s), one or more actions are taken to facilitate behavior-based malware detection. The action(s) taken may include performing a data reduction operation on data associated with the process, determining whether the process is an instance of blacklisted malware, determining whether the process is an instance of whitelisted software, etc. Some embodiments of the cybersecurity method 100 are described in further detail below. In some embodiments, one or more (e.g., all) steps of the method 100 may be performed by a cybersecurity engine.

In step 110, a process fingerprint is generated for a process. The process fingerprint identifies a process based on its dynamic features. In some embodiments, each unique process fingerprint corresponds to a unique set or sequence (e.g., time-ordered sequence) of dynamic process features (e.g., process behaviors). In some embodiments, the cybersecurity engine may treat processes that have the same process fingerprint as being behaviorally identical or as being instances of the same process.

The process fingerprint may be generated based, at least in part, on the process's dynamic features (e.g., the process's behavior). In some embodiments, a process fingerprint includes a value generated by performing operations (e.g., mathematical operations, logical operations, text-processing operations, hashing operations, data normalization operations, etc.) on data representing a process's dynamic features. For example, a process fingerprint may include a hash value (e.g., a cryptographic hash value) generated by performing a hashing operation (e.g., a cryptographic hashing operation) on data representing a process's dynamic features.

In some embodiments, a hashing operation is any operation that maps data of arbitrary size to data of fixed size. A hashing operation is said to be "deterministic" if the operation always generates the same hash value for the same input value or sequence of input values. A hashing operation is said to be "uniform" (or "substantially uniform") if the operation maps the expected range of input values evenly (or substantially evenly) over the range of hash values, such that each hash value in the range of hash values is generated with the same probability (or substantially the same probability). A hashing operation is said to be "continuous" if the difference between two hash values HV1 and HV2 generated for two input values IV1 and IV2, respectively, generally increases as the difference between the two input values increases and generally decreases as the difference between the two input values decreases. Using a continuous hash operation to generate process fingerprints may facilitate the task of searching for process fingerprints representing processes that exhibit similar (but not identical) dynamic features. In some embodiments, a cryptographic hashing operation is practically non-invertible (e.g., inverting the hashing operation would require a relatively long time and/or a relatively large amount of computational resources).

Any suitable hashing operation may be used. For example, the hashing operation may include, without limitation, a Secure Hash Algorithm (e.g., SHA-0, SHA-1, SHA-2, SHA-224, SHA-256, SHA-384, SHA-512, SHA-512/224, SHA-512/256, SHA-3, SHA3-224, SHA3-256, SHA3-384, SHA3-384, SHA3-512, SHAKE128, SHAKE256), a Merkle-Damgard hash function (e.g., MD4, MD5), a Fowler-Noll-Vo (FNV) hash function, a Jenkins hash function, etc.

The inventors have recognized and appreciated that a significant portion of the information that is useful for detecting suspicious process behavior and/or for forensic investigation of process behavior relates to the modules loaded by the process, the file operations associated with the process, the registry operations performed by the process, the process's network activity, and/or inter-process operations performed by the process. Accordingly, the data used to generate a process fingerprint may include data characterizing modules loaded by the process, data characterizing file operations associated with the process, data characterizing registry operations performed by the process, data characterizing network activity associated with the process, data characterizing inter-process operations performed by the process, etc.

During its execution, a process may load one or more modules (e.g., software modules). Loading a module may include copying the contents of the module (or a portion thereof) into the address space of the process, invoking the module (or a function thereof), executing the module (or a portion thereof), etc. Examples of modules include, without limitation, library modules (e.g., .DLLs), executable modules (e.g., .EXEs), kernel modules, binary files, etc. Data characterizing module(s) loaded by a process can, in some cases, be useful for detecting suspicious process behavior and/or for forensic investigation. Such data may include data representing a path to the loaded module, data identifying the loaded module (e.g., an MD5 hash value for the module), etc.

An executing process may perform one or more file operations. File operations include operations performed on files, operations that access the file system of a computing device, etc. Examples of file operations include creating a file, deleting a file, renaming a file, changing the attributes of a file, changing the access permissions of a file, opening a file, closing a file, reading data from a file, writing data to a file, etc.

Data characterizing file operations associated with a process can, in some cases, be useful for detecting suspicious process behavior and/or for forensic investigation. Such data may include data representing file operations performed by the process and/or data representing file operations through which the process was invoked. In some embodiments, data representing file operations performed by a process include data representing types of file operations performed by the process, data representing pathnames of files accessed by the process, data identifying child processes created by the process (e.g., a pathname of a file corresponding to a child process, and/or an MD5 hash value for the child process), etc. Data representing file operations through which a process was invoked may include data identifying a parent process that invoked the instant process (e.g., a pathname of a file corresponding to the parent process, and/or an MD5 hash value for the file), data representing a command (e.g., a command entered into a command-line terminal or shell) that initiated the process, data representing a pathname of a file corresponding to the process, etc. (A file "corresponding to" a process may include a file that contains instructions executed by the process, a file that is otherwise accessed to initiate execution of the process, etc.)

During its execution, a process may access one or more registry keys of an operating system (OS) registry. In general, an operating system registry may store values ("registry key values") of settings ("registry keys") for an OS kernel, other portions of an operating system, device drivers, services, and/or applications. A process with suitable access permissions may read the value of a registry key, write the value of a registry key, create a registry key, delete a registry key, etc. Data characterizing registry operations performed by a process can, in some cases, be useful for detecting suspicious process behavior and/or for forensic investigation. Such data may include data representing registry keys accessed by the process (e.g., names or pathnames of registry keys), data representing registry key values accessed by the process, data representing the type of access performed by the process on the registry key (e.g., read, write, read/write), etc.

An executing process may access a computer network to send data to and/or receive data from remotely located computers. Data characterizing network activity associated with a process can, in some cases, be useful for detecting suspicious process behavior and/or for forensic investigation. Such data may include data representing addresses (e.g., IP addresses, MAC addresses, etc.) of devices to which the process sends network communication and/or from which the process receives network communication, data representing ports through which the process sends and/or receives network communication, data representing the type of communication (sending, receiving, or sending and receiving) in which the process engages (e.g., through a particular port and/or with a device at a particular address), data representing the network protocol (e.g., TCP, IP, TCP/IP, UDP, ICMP, SSH, FTP, SMTP, HTTP, HTTPS, POP, SFTP, SSL, TLS, PPP, IMAP, WiFi, Bluetooth, etc.), etc.

During its execution, a process may perform one or more inter-process operations. An inter-process operation occurs when a process (the "source process") performs an operation that crosses a security boundary of another process (the "target process"). Some examples of inter-process operations include a process opening a handle to another process, a process opening a handle to a thread of another process, a process creating a thread within another process, etc. Data characterizing inter-process operations performed by a process can, in some cases, be useful for detecting suspicious process behavior and/or for forensic investigation. Such data may include information identifying the target process (e.g., the path of the target process, an MD5 hash value for the target process, the user context of the target process, etc.), information indicating the access permissions requested by the source process (e.g., a permissions bitmask), information identifying the type of inter-process operation performed (or requested) by the source process, etc.

In some embodiments, data representing a process's dynamic features may include timing data (e.g., data indicating the time when a process performs an operation, the time intervals between two or more operations, etc.). In some embodiments, such timing data may be excluded from the data representing a process's dynamic features.

An example of generating a process fingerprint PF for a process P executing on a computer C is now described. In this example, the process P is initiated by executing a file F. The process P communicates with a device at the IP address ABC.DEF.GHI.J and modifies (e.g., opens and writes data to) the file F. In this example, a cybersecurity engine generates a data value V1 identifying the pathname of the file F and indicating that process P was initiated by executing file F, generates a data value V2 identifying the IP address ABC.DEF.GHI.J and indicating that process P communicated with a device at that IP address, and generates a data value V3 indicating that process P modified file F. The cybersecurity engine may generate a process fingerprint PF for the process P by performing a hashing operation on the data values V1, V2, and V3. The foregoing example is non-limiting, and is provided merely to illustrate one example of how the techniques described herein may be applied to generate a process fingerprint.

In some embodiments, a cybersecurity engine may generate a set of two or more process fingerprints for a process. For example, a cybersecurity engine may generate a first process fingerprint based (at least in part) on data characterizing modules loaded by a process, generate a second process fingerprint based (at least in part) on data characterizing file operations associated with the process, generate a third process fingerprint based (at least in part) on data characterizing registry operations performed by the process, generate a fourth process fingerprint based (at least in part) on data characterizing network activity associated with the process, etc.

Generating multiple process fingerprints for a process may facilitate the detection of suspicious process behavior. A malware developer may configure a malware program to attempt to avoid detection by performing a variety of innocuous operations (e.g., by performing a different set of innocuous operations each time the malware program is executed). In this way, the malware program could attempt to change its process fingerprint(s) each time it executes, making it more difficult to reliably identify the malware program based on its process fingerprint(s). By generating multiple process fingerprints corresponding to different types of dynamic process features, the cybersecurity engine may more easily distinguish suspicious process behaviors from innocuous process behaviors, including innocuous behaviors intended to disguise the suspicious behaviors. In addition, since some embodiments of process fingerprints are lossy (i.e., the generated process fingerprint, in some embodiments, does not retain all of the information contained in the data used to generate the fingerprint), a set of two or more process fingerprints corresponding to different categories of data may, in some embodiments, retain more information about process behavior than a single fingerprint based on those same categories of data.

In some embodiments, the cybersecurity engine may use any suitable subset(s) of data to generate one or more process fingerprints. For example, a cybersecurity engine may generate a process fingerprint based solely on data characterizing network activity associated with the process, or based solely on data characterizing registry operations performed by the process and data characterizing modules loaded by the process, or based on any suitable type of data or combination of types of data, including (but not limited to) the types of data described herein.

In some embodiments, the cybersecurity engine may use a rolling hash operation to generate a process fingerprint. With a rolling hash operation, the data values representing a process's dynamic features are supplied to the hash operator as those data values are generated (e.g., as the process performs the operations represented by those data values), and the rolling hash operation updates the process fingerprint (e.g., recalculates the value of the process fingerprint) based on the supplied data values as those data values are received. One advantage of a rolling hash operation is that a process fingerprint can be generated "on the fly," while the process is executing, which may facilitate quick detection of malware processes. One potential disadvantage of a rolling hash operation is that different process fingerprints may be generated for two processes that perform exactly the same operations, but perform those operations in different orders.

In some embodiments, the malware detection may use a deterministic, sequence-invariant (DSI) hash operation to generate a process fingerprint. With a DSI hash operation, the cybersecurity engine generates the same process fingerprint for a set of data values representing dynamic features of a process, irrespective of the order in which the process performed the operations characterized by those data values. As just one example of a DSI hash operation, the cybersecurity engine may maintain the set of data values representing the dynamic features of a process until the process terminates, sort the set of data values (with or without removal of duplicate data values), and apply a deterministic hash operator to the sorted data values. One advantage of a DSI hash operation is that the same process fingerprints may be generated for two processes that perform the same operations, even if the processes perform those operations in different orders, which may make it more difficult for malware processes to disguise themselves. One potential disadvantage of at least some DSI hash operations is that it may be infeasible to perform these hash operations "on the fly," while the process is executing.

Returning to FIG. 1, in step 120, the process fingerprint generated in step 110 is compared to one or more sets of process fingerprints generated based on dynamic features (e.g., behavior) of known software. In some embodiments, the one or more sets of process fingerprints may include a set of blacklisted fingerprints. Although a process fingerprint could be blacklisted for any suitable reason, in some embodiments, a process fingerprint's presence on a blacklist may indicate that the process corresponding to the fingerprint has been identified as a malware process. In some embodiments, the cybersecurity engine may obtain a set of blacklisted process fingerprints (or obtain data identifying one or more process fingerprints as blacklisted fingerprints) from a trusted source (e.g., a cybersecurity provider). The trusted source may obtain the blacklisted process fingerprints using any suitable technique, including executing known malware processes, generating the fingerprints for those malware processes (e.g., using the techniques described herein), and storing the generated fingerprints.

In some embodiments, the trusted source may also generate a log of the malware process's behavior (e.g., using behavior logging techniques known to one of ordinary skill in the art), and store the log in connection with the malware process fingerprint. To the extent that such a log is representative of the behavior of the malware process, the log may be useful for forensic investigation when the malware process fingerprint is detected by a cybersecurity engine. In this way, when the cybersecurity engine detects that a system has executed a process with a known (e.g., blacklisted) process fingerprint, a behavior log that is representative of the behavior of the process can be made available for forensic investigation, even if the system that executed the process did not expend its own processing resources and data resources to maintain a behavior log.

In some embodiments, the one or more sets of process fingerprints may include a set of whitelisted fingerprints. Although a process fingerprint could be whitelisted for any suitable reason, in some embodiments, a process fingerprint's presence on a whitelist may indicate that the process corresponding to the fingerprint has been identified as a trusted process. In some embodiments, the cybersecurity engine may obtain a set of whitelisted process fingerprints (or obtain data identifying one or more process fingerprints as whitelisted fingerprints) from a trusted source (e.g., a cybersecurity provider). The trusted source may obtain the whitelisted process fingerprints using any suitable technique, including executing known trusted processes, generating the fingerprints for those trusted processes (e.g., using the techniques described herein), and storing the generated fingerprints.

In some embodiments, comparing the process fingerprint F generated in step 110 to known process fingerprints may involve searching for exact matches between the process fingerprint F and the known process fingerprints (e.g., determining whether the value of the process fingerprint F is identical to the value of a known fingerprint). Alternatively or in addition, comparing the process fingerprint F to known process fingerprints may involve searching for substantial matches between the process fingerprint F and the known process fingerprints (e.g., determining whether the value of the process fingerprint F is sufficiently similar to the value(s) of any of the known fingerprints). In some embodiments, the value V1 of the fingerprint F is sufficiently similar to the value V2 of a known fingerprint if the difference (or the magnitude of the difference) between V1 and V2 is less than a threshold value, if the percent difference (or the magnitude of the percent difference) between V1 and V2 is less than a threshold percentage, etc. As discussed above, a malware process can attempt to avoid detection by varying its behavior, thereby changing or disguising its fingerprint(s). In some embodiments, using a continuous hashing operation to generate process fingerprints, in combination with searching for known fingerprints that are sufficiently similar to the process fingerprint F, may facilitate detection of malware processes that attempt to disguise suspicious behaviors.

Returning to FIG. 1, in step 130, based on the result(s) of the process fingerprint comparison(s), the cybersecurity engine performs one or more actions to facilitate behavior-based malware detection. In some embodiments, the cybersecurity engine performs such action(s) if an exact match between a process fingerprint F and a known process fingerprint is detected in step 120. In some embodiments, the cybersecurity engine performs such action(s) if an exact match or a substantial match between a process fingerprint F and a known process fingerprint is detected in step 120. The action(s) taken may include, without limitation, performing a data reduction operation on data associated with the process, determining whether the process is blacklisted malware, determining whether the process is whitelisted software, providing a message to a user of the system that executed the process, configuring the system to prohibit execution of the file (e.g., binary file) corresponding to the process, setting up a honeypot, initiating a forensic investigation of the process, etc.

In some embodiments, the cybersecurity engine may perform a data reduction operation on data associated with the process P. While the process P is executing, the system executing the process P may generate a log of at least some operations performed by the process. In some embodiments, the data reduction operation may include deleting the log or a portion thereof. As described above, the cybersecurity engine may store behavior logs corresponding to process fingerprints. Thus, in cases where the process fingerprint of the process P matches a known process fingerprint, the log of process P's behavior may provide little or no additional useful information beyond the information provided by the cybersecurity engine's behavior log for the corresponding process fingerprint. Deleting the log of process P's behavior (or a portion thereof) therefore can reduce the amount of data storage devoted to facilitating forensic investigation of process P, without sacrificing much (or any) useful information. In some embodiments, rather than storing the deleted process log (or portion thereof), the system may store the fingerprint of the process P. Optionally, the system may also store data indicating the data and/or time of execution of the process P.

In some embodiments, the results of the process fingerprint comparison may indicate that the process P is a blacklisted malware process (e.g., because the fingerprint of process P matches the fingerprint of a blacklisted process). If so, the cybersecurity engine may provide (e.g., display or send) a message to a user of the system and/or to the cybersecurity engine. The message may indicate that the executed process P is suspected of being a malware process. Other actions that the cybersecurity engine may take in response to the detection of a suspected malware process include, without limitation, configuring the system to prohibit execution of the file (e.g., binary file) corresponding to the process P, initiating a forensic investigation of the process, etc.

In some embodiments, the results of the process fingerprint comparison may indicate that the process P is a whitelisted software process (e.g., because the fingerprint of process P matches the fingerprint of a whitelisted process).

In some embodiments, the process fingerprint of a process P may be compared to other process fingerprints only after the process P has finished executing. In some embodiments, a partial process fingerprint of an executing process P (e.g., a process fingerprint generated based on the behaviors that the process P has already exhibited) may be compared to other process fingerprints while the process P is still executing. In the latter case, if the partial fingerprint of process P matches a full or partial fingerprint of a blacklisted process, the cybersecurity engine may terminate the executing process P, quarantine the executing process P, continue executing the process P in a restricted state (to limit the scope of the threat posed by the potential malware process) or in a honeypot, notify a user of the system that the process is suspected of being a malware process, etc. If the partial fingerprint of process P matches a full or partial fingerprint of a whitelisted process, the cybersecurity engine may permit the process P to continue executing, shift the execution of process P from a restricted state to an unrestricted state, etc.

The malware detection and response method 100 illustrated in FIG. 1 and described above is just one example of a malware detection and response method based on process fingerprints. Process fingerprints generated in accordance with the techniques described herein and their equivalents may be used in any suitable malware detection and/or response methods, engines, and systems. For example, a malware detection method may include generating a process fingerprint of a process, wherein generating the process fingerprint comprises performing a cryptographic hash operation on data representing dynamic features of the process, and determining, based at least in part on the process fingerprint, whether the process is a malware process.

In some embodiments, in addition to being based (at least in part) on a process's dynamic features, a process fingerprint may be based, at least in part, on the process's static features (e.g., the sequence(s) of bytes contained in the file(s) corresponding to the process, a hash of the file or portion thereof, etc.). Generating a process fingerprint based on dynamic features of the process and static features of the file corresponding to the process may facilitate detection of malware.

Further Description of Some Embodiments

Some embodiments of the methods and operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, for example web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 2:
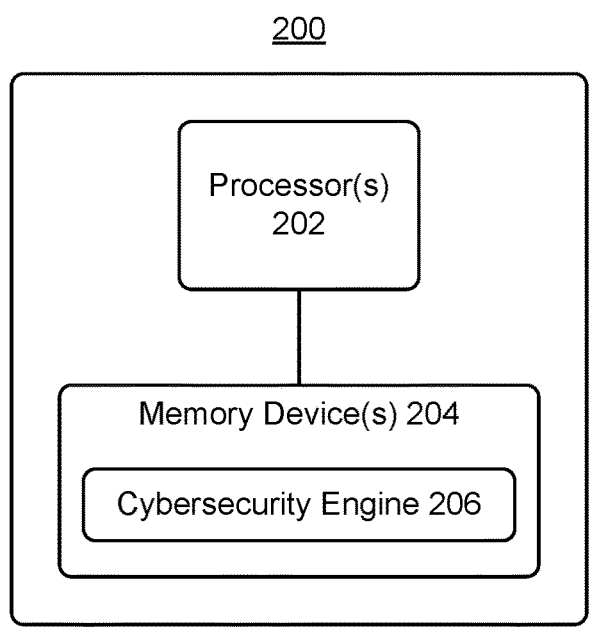
FIG. 2 is a block diagram of a computer, in accordance with some embodiments.

FIG. 2 shows a block diagram of a computer 200. The computer 200 includes one or more processors 202 for performing actions in accordance with instructions and one or more memory devices 204 for storing instructions and data. In some embodiments, the computer 200 executes a cybersecurity engine 206. The cybersecurity engine 206 may perform a malware detection and/or response method (e.g., cybersecurity method 100). Different versions of the cybersecurity engine 206 may be stored, distributed, or installed. Some versions of the software may implement only some embodiments of the methods described herein.

Generally, a computer 200 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations may be described in this disclosure or depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B")

can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A computer-implemented cybersecurity method comprising:
   generating a log indicating a plurality of operations performed by a process and a plurality of respective times associated with the operations;
   generating a process fingerprint of the process, wherein the process fingerprint identifies the process based, at least in part, on dynamic features of the process;
   comparing the process fingerprint to a plurality of process fingerprints; and
   based, at least in part, on a result of the comparison indicating that the process fingerprint matches a process fingerprint included in the plurality of process fingerprints, performing a data reduction operation on data associated with the process, wherein performing the data reduction operation on the data associated with the process comprises deleting the log,
   wherein generating the process fingerprint comprises performing a cryptographic hash operation on data representing dynamic features of the process, and
   wherein the data representing dynamic features of the process comprises data characterizing modules loaded by the process, data characterizing file operations associated with the process, data characterizing registry operations performed by the process, data characterizing network activity associated with the process, and/or data characterizing inter-process operations performed by the process.

2. The method of claim 1, wherein the data representing dynamic features of the process comprises the data characterizing modules loaded by the process.

3. The method of claim 1, wherein the data representing dynamic features of the process comprises the data characterizing file operations associated with the process.

4. The method of claim 1, wherein the data representing dynamic features of the process comprises the data characterizing registry operations performed by the process.

5. The method of claim 1, wherein the data representing dynamic features of the process comprises the data characterizing network activity associated with the process.

6. The method of claim 1, wherein the data representing dynamic features of the process comprises the data characterizing inter-process operations performed by the process.

7. The method of claim 1, wherein generating the process fingerprint further comprises performing the cryptographic hash operation on data representing static features of a file corresponding to the process.

8. The method of claim 1, wherein the cryptographic hash operation is a rolling cryptographic hash operation.

9. The method of claim 1, wherein the cryptographic hash operation is a deterministic, sequence-invariant cryptographic hash operation.

10. The method of claim 1, wherein generating the process fingerprint comprises generating a first process fingerprint and a second process fingerprint.

11. The method of claim 10, wherein generating the first process fingerprint comprises performing a cryptographic hash operation on data representing first dynamic features of the process, and wherein generating the second process fingerprint comprises performing a cryptographic hash operation on data representing second dynamic features of the process.

12. The method of claim 11, wherein the data representing first dynamic features of the process are selected from a group comprising data characterizing modules loaded by the process, data characterizing file operations associated with the process, data characterizing registry operations performed by the process, data characterizing network activity associated with the process, and data characterizing inter-process operations performed by the process.

13. The method of claim 12, wherein the data representing second dynamic features of the process are different from the data representing first dynamic features of the process, and wherein the data representing second dynamic features of the process are selected from a group comprising data characterizing modules loaded by the process, data characterizing file operations associated with the process, data characterizing registry operations performed by the process, data characterizing network activity associated with the process, and data characterizing inter-process operations performed by the process.

14. The method of claim 1, wherein performing the data reduction operation on the data associated with the process further comprises replacing the log with the process fingerprint of the process.

15. The method of claim 1, wherein performing the data reduction operation on the data associated with the process further comprises replacing the log with the process fingerprint of the process and data indicating a date and/or time of execution of the process.

16. The method of claim 1, further comprising determining whether the process is a malware process based, at least in part, on the result of the comparison.

17. The method of claim 16, wherein the plurality of process fingerprints includes one or more process fingerprints of one or more blacklisted processes, and wherein determining whether the process is a malware process based on the result of the comparison comprises determining that the process is a malware process based on the process fingerprint matching a fingerprint included in the one or more process fingerprints of the one or more blacklisted processes.

18. The method of claim 16, wherein the plurality of process fingerprints includes one or more process fingerprints of one or more whitelisted processes, and wherein determining whether the process is a malware process based on the result of the comparison comprises determining that the process is not a malware process based on the process fingerprint matching a fingerprint included in the one or more process fingerprints of the one or more whitelisted processes.

19. A cybersecurity system, comprising:
 data processing apparatus programmed to perform operations comprising:
  generating a log indicating a plurality of operations performed by a process and a plurality of respective times associated with the operations;
  generating a process fingerprint of a process, wherein the process fingerprint identifies the process based, at least in part, on dynamic features of the process;
  comparing the process fingerprint to a plurality of process fingerprints; and
  based, at least in part, on a result of the comparison indicating that the process fingerprint matches a process fingerprint included in the plurality of process fingerprints, performing a data reduction operation on data associated with the process, wherein performing the data reduction operation on the data associated with the process comprises deleting the log,
 wherein generating the process fingerprint comprises performing a cryptographic hash operation on data representing dynamic features of the process, and
 wherein the data representing dynamic features of the process comprises data characterizing modules loaded by the process, data characterizing file operations associated with the process, data characterizing registry operations performed by the process, data characterizing network activity associated with the process, and/or data characterizing inter-process operations performed by the process.

20. The system of claim 19, wherein the cryptographic hash operation is a rolling cryptographic hash operation.

21. The system of claim 19, wherein the cryptographic hash operation is a deterministic, sequence-invariant cryptographic hash operation.

22. The system of claim 19, wherein generating the process fingerprint comprises generating a first process fingerprint and a second process fingerprint.

23. The system of claim 22, wherein generating the first process fingerprint comprises performing a cryptographic hash operation on data representing first dynamic features of the process, the first dynamic features being dynamic features of a first type, and wherein generating the second process fingerprint comprises performing a cryptographic hash operation on data representing second dynamic features of the process, the second dynamic features being dynamic features of a second type different from the first type.

24. The system of claim 19, wherein performing the data reduction operation on the data associated with the process further comprises replacing the log with the process fingerprint of the process.

25. The system of claim 19, wherein the operations further comprise determining whether the process is a malware process based, at least in part, on the result of the comparison.

26. The system of claim 25, wherein:
 the plurality of process fingerprints includes one or more process fingerprints of one or more blacklisted processes, and
 determining whether the process is a malware process based on the result of the comparison comprises determining that the process is a malware process based on the process fingerprint matching a fingerprint included in the one or more process fingerprints of the one or more blacklisted processes.

27. The system of claim 25, wherein:
 wherein the plurality of process fingerprints includes one or more process fingerprints of one or more whitelisted processes, and
 wherein determining whether the process is a malware process based on the result of the comparison comprises determining that the process is not a malware process based on the process fingerprint matching a fingerprint included in the one or more process fingerprints of the one or more whitelisted processes.

28. A computer storage medium having instructions stored thereon that, when executed by a data processing apparatus, cause the data processing apparatus to perform operations comprising:
 generating a log indicating a plurality of operations performed by a process and a plurality of respective times associated with the operations;
 generating a process fingerprint of the process, wherein the process fingerprint identifies the process based, at least in part, on dynamic features of the process;
 comparing the process fingerprint to a plurality of process fingerprints; and
 based, at least in part, on a result of the comparison indicating that the process fingerprint matches a process fingerprint included in the plurality of process fingerprints, performing a data reduction operation on data associated with the process, wherein performing the data reduction operation on the data associated with the process comprises deleting the log,
 wherein generating the process fingerprint comprises performing a cryptographic hash operation on data representing dynamic features of the process, and
 wherein the data representing dynamic features of the process comprises data characterizing modules loaded by the process, data characterizing file operations associated with the process, data characterizing registry operations performed by the process, data characterizing network activity associated with the process, and/or data characterizing inter-process operations performed by the process.

* * * * *